S. A. FOX.
ADJUSTABLE REAMER.
APPLICATION FILED AUG. 31, 1914.

1,117,946.

Patented Nov. 17, 1914.

Witnesses:
M. J. Pfeifer.
L. E. Barkley.

Inventor:
Samuel Alexander Fox,
by Frank S. Annerman,
Atty

UNITED STATES PATENT OFFICE.

SAMUEL ALEXANDER FOX, OF HAMPSTEAD, LONDON, ENGLAND.

ADJUSTABLE REAMER.

1,117,946. Specification of Letters Patent. Patented Nov. 17, 1914.

Application filed August 31, 1914. Serial No. 859,450.

*To all whom it may concern:*

Be it known that I, SAMUEL ALEXANDER FOX, a subject of the King of the United Kingdom of Great Britain and Ireland, and residing at 29 Belsize Crescent, Hampstead, London, N. W., England, have invented new and useful Improvements in Adjustable Reamers, of which the following is a specification.

My invention applies to that type of reamer for machine or hand use, which is provided with loose blades, which are located in slots in a substantially cylindrical shell, and which can be moved in or out radially in relation to the axis of the shell by means of internal mechanism provided for this purpose.

The purposes of my invention are to secure in reamers of this class an outer shell stiffened by its particular form and section to withstand effectively the tendency to distortion under the action of the cutting stresses, and to obtain a range of adjustment of the cutting blades sufficient and capable of being readily and quickly made to any practicable degree of refinement.

My improvement according to the present invention consists in providing the shell of adjustable reamers of the aforesaid type with an internal member, such as a partition, wall, flange or bridge interconnecting at or about the middle of their length the shell segments situated between the blade slots, said member preferably being integral with said shell segments.

A further improvement consists in the provision in reamers of the aforesaid type of a plurality of cones movable relatively to one another and means for adjusting the same with a view to effecting the radial adjustment of the blades.

Two embodiments of the present invention are illustrated by way of example in the accompanying drawings.

Figure 1:
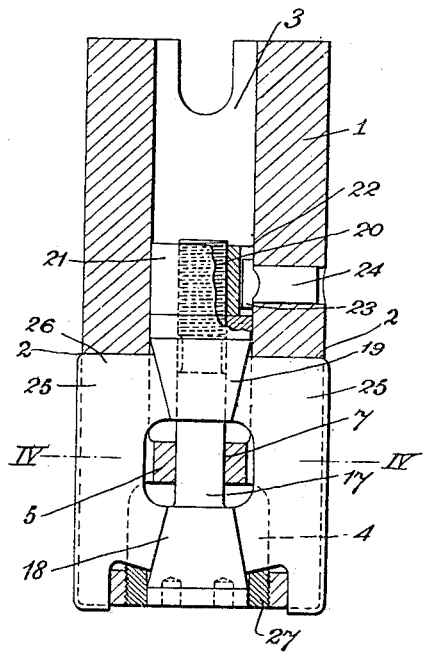
Figure 2:
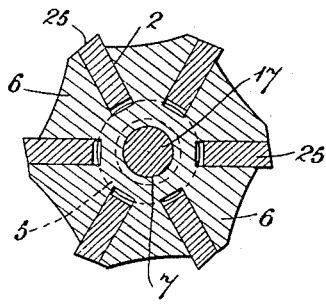

In said drawings:—Figure 1 is a vertical longitudinal section through a reamer constructed according to my invention. Fig. 2 is a transverse section on the line IV—IV Fig. 1.

Referring to the drawings, the reamer consists of a shell 1 having slots 2, 2 at its periphery and having axial recesses 3, 4 at its ends separated by the member 5 which is in the form of a partition, wall, flange, or annular bridge, which interconnects at or about the middle of their length the shell segments 6, 6 situated between the slots 2, 2 and which is provided with a central hole 7. Blades 25 are fitted in the slots 2, 2 between the segments 6, 6 each of said blades being in the shape of a flat U, the shanks of which have edges inclined to the axis of the shell.

The adjusting bolt 17 has a conical head 18 and a cone 19 movable relatively to said conical head 18, said cone has a central hole through which the shank of the bolt 17 passes. The end of said shank is provided with a screw thread 20 and a nut 21 engages with the same. Said nut has a keyway 22 in which the head 23 of the feather-pin 24 engages, so that said nut can not rotate relatively to the shell but can move axially with regard to the same. The blades 25 are of the shape illustrated, their ends 26 always abutting, when in position, against the adjacent ends of the slots in which they are situated. 27 is a locking collar for locking said blades when adjusted.

To adjust the blades the collar 27 is slackened, the bolt 18 is turned until the nut 21 has moved vertically relatively to the bolt through the desired amount to allow the cones to be the required distance apart to give the blades the proper radial adjustment. The collar 27 is then tightened to lock the blades in position.

It will eb understood that instead of the bolt 17 having a conical head it might have a head of any suitable shape, and be provided with a loose cone similar to the cone 19.

What I claim as my invention and desire to secure by Letters Patent is:—

1. An adjustable reamer comprising a shell having a plurality of slots at its periphery, blades in the slots, a bridge having a central opening connecting the walls of the shell between the slots, a bolt having a threaded portion extending into the shell and projecting through the opening in the bridge, cones on the bolt for engaging the blades, a nut operating on the threaded portion of the bolt, said nut adapted to move one of the cones when the bolt is moved and means for preventing rotary movement of the nuts.

2. An adjustable reamer comprising a shell said shell having a plurality of radial slots, a blade in each slot, a bolt extending into the shell, said bolt having a cone head and a threaded portion, a cone on the bolt, said cones adapted to engage the blades for moving the same, a nut operating on the threaded portion of the bolt, for moving the last mentioned cone, and means for preventing rotation of the nut.

3. An adjustable reamer comprising a shell having a plurality of radial slots, blades operating in the slots, a bolt extending into the shell, an integral cone on the bolt, said shell having an opening in the wall thereof, a nut on one end of the bolt, said nut having a longitudinal slot, a key in the opening in the wall of the shell, said key engaging in the slot of the nut to prevent rotation of the nut, whereby the nut moves one of the cones longitudinally of the bolt for adjusting the blades, when the bolt is rotated.

In testimony whereof I have signed my name to this specification in the presence of two subscribing witnesses.

SAMUEL ALEXANDER FOX.

Witnesses:
 REGINALD HARRY PRATT,
 CLEMENT LEAR.

Copies of this patent may be obtained for five cents each, by addressing the "Commissioner of Patents, Washington, D. C."